United States Patent Office 3,469,976
Patented Sept. 30, 1969

3,469,976
ISOSTATIC HOT PRESSING OF METAL-BONDED METAL CARBIDE BODIES
Ralph K. Iler, Wilmington, Del., assignor to E. I. du Pont de Nemours and Company, Wilmington, Del., a corporation of Delaware
No Drawing. Filed July 31, 1967, Ser. No. 657,048
Int. Cl. B22f 3/00; C22c 1/04, 1/10
U.S. Cl. 75—204
24 Claims

ABSTRACT OF THE DISCLOSURE

A mixture of a powdered metal carbide and a powdered binder metal is formed into a billet by compacting the mixture and sintering the resulting compact. The sintered billet is placed in a hot pressing mold where it is surrounded with a powdered borosilicate glass which contains from about 83 to about 99.7% by weight $SiO_2$ and from about 0.3 to about 17% by weight $B_2O_3$ and which is essentially free of alkali and alkaline earth metals. The billet and surrounding glass are heated to a temperature sufficient to render the glass plastic and while maintaining that temperature, pressure is applied to the glass, thereby isostatically hot pressing the billet. Articles of near theoretical density can thus be obtained. Hot pressing temperatures of from 1200 to 1700° C. and pressures of from 3000 to 6000 p.s.i. are representative. Borosilicate glasses containing from 86 to 99% by weight $SiO_2$ and from 1 to 14% by weight $B_2O_3$ are preferred for the 1200 to 1700° C. temperature range.

BACKGROUND OF THE INVENTION

This invention relates to the production of high-density metal-bonded metal carbide articles. Such articles exhibit superior performance as cutting edges for machining hard, high-strength alloys, drilling rocks, cutting and shaping other hard materials and for other uses where very strong, very hard compositions are required.

Methods heretofore utilized to produce such articles have generally involved hot pressing of a powdered or compacted sample in a close fitting, rigid mold or isostatically hot pressing a sealed, deformable container containing a powdered or compacted sample utilizing a gas as the pressure-transmitting medium. In both of these methods the sample, whether originally a powder or a compact, assumes the shape of the mold or deformed container.

Several notable problems are encountered when the above methods are used. The sizes and shapes of articles that can be produced are limited. Finished articles having complex shapes often contain undesirable density gradients because of non-uniform pressure distribution during pressing. Also, each sample must be compressed in a separate mold or container and after hot pressing the sample often adheres to the mold or container, usually resulting in damage to the sample and the mold or container during separation.

Isostatic pressing of self-sustaining compacts has been suggested as a possible method of overcoming the above-mentioned problems. For example, Ballard and Hendricks in U.S. Patent 3,279,917 propose the use of a particulate material such as powdered glass or natural flake graphite as a pressure-transmitting medium in the hot pressing of refractory bodies. In this method the particulate pressure-transmitting medium does not conform completely to the sample and as a consequence, pressure is still not transmitted uniformly and truly isostatically. Various shapes such as cubes, round rods and the like are distorted when pressure is applied. It is virtually impossible to form intricate contours by this method.

SUMMARY OF THE INVENTION

In summary, this invention relates to an improvement in the isostatic hot pressing of a metal-bonded metal carbide body comprising surrounding said body with a borosilicate glass consisting essentially of from about 83 to about 99.7% by weight $SiO_2$ and from about 0.3 to about 17% by weight $B_2O_3$, said glass being essentially free of alkali and alkaline earth metals, heating said glass to a temperature sufficient to render it plastic and while maintaining said temperature, applying to said glass a pressure sufficient to increase the density of said body.

In this manner, low porosity, metal-bonded metal carbide articles having a variety of shapes and sizes can be compressed to extremely low porosity and to substantially theoretical density without substantially altering their original shapes because upon application of heat and pressure the plastic glass conforms readily to the shapes of the samples, providing uniform pressure-transmission.

Very intricate contours such as those in a drill bit are reproduced with essentially no distortion. Also, several samples of widely varying shapes and sizes can be pressed simultaneously in the same mold. This ability to hot press a plurality of samples simultaneously provides a very substantial economic advantage in commercial operations. After hot pressing, samples do not adhere to the pressure-confining walls of the mold because the binder-metal is isolated from the mold walls by the substantially inert and impervious pressure-transmitting medium, thereby significantly reducing the incidence of damage to expensive pressing molds and to the product. As used herein, the term "mold" refers to the container which confines the mass under pressure.

DETAILED DESCRIPTION OF THE INVENTION

Low porosity metal carbide bodies

This invention is most advantageously applied to the production of articles from those hard metal carbides which give outstanding performance in applications where a particularly strong, hard, tough, chip-resistant article is required, for example, in metal removal, rock drilling and the shaping of non-metallic materials. These carbides comprise, principally tungsten carbide, titanium carbide, tantalum carbide, niobium carbide and mixtures thereof. Although these carbides will generally constitute the major components in the finished bodies, other refractory materials such as other carbides, oxides, borides, nitrides, or silicides, can be present in minor amounts to give desired modifications of physical properties. The bodies also contain varying proportions of a metal binder which is generally selected from the group of iron, cobalt, nickel, molybdenum and their alloys. Other metals can also be present in minor amounts. Preferably, the bodies will contain from about 70% to about 97% by weight of the hard metal carbide and from about 3% to about 30% by weight of the metal binder.

Products having a unique combination of high strength plus hardness are obtained by the methods of this invention when billets are prepared from powders comprising from about 70% to about 97% by weight of tungsten carbide particles interdispersed with from about 3% to about 30% by weight of iron, cobalt or nickel. Cobalt is the preferred binder metal for compositions of tungsten carbide and preferably comprises from about 6% to about 15% by weight of the composition. Minor amounts of titanium carbide, tantalum carbide or niobium carbide can also be incorporated into the composition.

The bodies which can be compressed by the methods of this invention, sometimes referred to hereinafter as "billets," are produced from intimate mixtures of one or more powdered metal carbide and one or more powdered binder metal. These mixtures, which should be comprised of particles having an average diameter of less than ten microns and preferably less than two microns, can be prepared by any conventional method such as ball milling. Suitable mixtures and methods of preparation are described in Alexander et al., U.S. Patent 3,249,407, and in Cemented Carbides, Schwarzkopf and Kieffer, MacMillan Company, (New York 1960).

A variety of well-known methods can be used to produce suitable billets from the mixtures described above.

In one preferred method a sample of a metal carbide-binder metal mixture is loaded into a carbide-lined die fitted with carbide-faced punches, pressure is applied to the sample without applying heat and after releasing the pressure, the resulting compact is removed and sintered in a non-oxidizing environment. The pressure applied will ordinarily be from about 200 p.s.i. to about 10,000 p.s.i. and sintering times are normally held to less than one hour. Sintering temperatures, depending on composition, will usually range from about 1300° to as high as about 1500° C.

A similar procedure involves charging the powder into a thin walled rubber mold which is evacuated and sealed and then subjected to isostatic pressure in a liquid medium, at ambient temperatures and at pressures of from 1000 to 100,000 p.s.i. The resulting compact is removed from the rubber mold and sintered as described above. This technique is particularly preferred for the production of billets of irregular or intricate shapes.

Sintering in the above-described procedure is preferably continued until the density of the compact reaches at least 60% of theoretical and most preferably at least 90% of theoretical. It also is preferred that substantially all surface pores in the sintered billet be less than 100 microns in diameter. Usually the plastic glass will not penetrate pores of this diameter to any substantial distance during hot pressing. Penetration to the extent of about 50 mils can, however, be remedied by merely grinding away the outer "skin" of the finished article. If the finished product is to be cut into sections for use, a limited number of even major imperfections can sometimes be tolerated because imperfect sections can merely be discarded. Preferably, substantially all surface pores in the billet are less than 50 microns, and most preferably less than 10 microns in diameter.

The method of this invention is especially suitable for fabricating extremely strong, hard bodies from sintered billets in which the ultimate grain size of the metal carbide is less than one-half micron and in which the surface pores are correspondingly finer than one-half micron. Such billets, containing for example, from 88 to 91% by weight of the submicron tungsten carbide and from 9 to 12% of cobalt, are impervious to the plastic glass used in the method of this invention and can be isostatically hot pressed to produce articles having densities over 99% of theoretical, transverse rupture strengths in excess of 470,000 pounds per square inch and hardnesses greater than 91.0 Rockwell A, such articles being slightly deficient in carbon in regard to stoichiometric tungsten carbide. Such sintered billets and articles produced therefrom are fully described in U.S. application, Ser. No. 516,825, filed Nov. 24, 1965.

To gain the maximum benefit from the method of this invention, the billets should possess the shape desired for the final article since one of the major objectives of this invention is to press under isostatic conditions so that there is little or no distortion of the billet. The shape of the billet will, of course, be determined by the shape of the mold in which it is produced. Where cylindrical or cubical articles are desired, rigid molds are satisfactory, but where intricate contours are desired, the use of rubber mold as described above is much more convenient. Sintered billets can, of course, be machined or ground to the shape of the final article desired or can be machined or ground to remove imperfections.

Hot pressing mold

Graphite, tungsten metal and molybdenum metal are highly preferred construction materials for molds and other parts of the pressing apparatus utilized in carrying out the methods of this invention. Obviously, other materials can be employed but preferred materials of construction for the molds and pistons are those which not only have adequate strength at the temperature utilized in the pressing step of the methods of this invention, but also do not react with the pressure-transmitting medium utilized, thereby insuring ready ejection of the compressed mass after cooling. Graphite of low porosity and high strength is most preferred.

Borosilicate glass

The borosilicate glass used in the method of this invention should be essentially free of alkali and alkaline earth metals. Up to 0.05% by weight of alkali or alkaline earth metals can be tolerated. But as little as 0.02% by weight can cause reaction between the glass and the billet and should therefore be avoided. Somewhat larger amounts of compounds such as $Al_2O_3$ do not significantly affect the usefulness of the glass but more than five percent by weight of such compounds should also be avoided.

Borosilicate glasses suitable for use in the method of this invention can be produced by leaching the alkali and alkaline earth metals from conventional borosilicate glass with water containing a strong mineral acid. Conventional borosilicate glass is produced by fusing an alkali or alkaline earth metal silicate with boric oxide or a source of boric oxide.

A preferred method of producing borosilicate glasses which are essentially free of alkali and alkaline earth metals is disclosed and claimed in my application entitled "Manufacture of Borosilicate Glass Essentially Free of Alkali and Alkaline Earth Metals" which is filed concurrently herewith. This method involves heating a mixture of colloidally subdivided amorphous silica and submicron boric oxide to a temperature of from 500 to 1600° C. No leaching of the resulting borosilicate glass is required. When temperatures of from 500 to 800° C. are utilized, the product is obtained directly as a powder and does not require comminution before use. This method can, of course, be carried out in the hot pressing mold during heat-up to the hot pressing temperature, but it will ordinarily be more convenient to produce large batches of the glass well in advance of use.

The borosilicate glasses used in the methods of this invention are solids at room temperature and are preferably used in the form of fine powders to promote rapid development of plastic properties. While fine powders are definitely preferred, their use is not essential. For example, ¼ inch lumps of glass can be used successfully but precautions must be taken to insure that a sufficient amount of glass is present to completely surround the billet after pressure is first applied.

Because of their varying compositions, these glasses soften over a range of temperatures and are best described as becoming "putty-like" at their respective use temperatures. The compositions are non-crystalline and, therefore, do not have a sharp melting or crystallization point. Each composition softens and maintains its plasticity over a temperature range of the order of 100° C., making it practical to employ the medium in the hot pressing process of this invention. Crystalline material with a sharp melting point, or change in state from an immobile solid to a very fluid liquid would be inoperable in a practical process.

The fluidity of the glass at hot pressing temperatures is of extreme importance. At the hot pressing temperature a medium should be sufficiently fluid so that it conforms to the shape of the billet before any application of pressure or at least at the very first application of pressure. Otherwise, uniform pressure-transmission is not obtained and excessive distortion of the billet can result, e.g., flattening of cylindrical billets into oval shapes and bulging of the edges of cubical billets. However, the medium should not be so fluid that it is forced out of the mold through the space between the pistons and the mold, since excessive distortion of the billet and freezing of the pistons to the mold can result.

Since the fluidity of a given glass usually increases as it is heated above its initial softening point and since the maximum permissible fluidity is governed in part by the porosity of the billet, in part by the exactness of the fit between the pistons and mold used and in part by the amount of pressure applied, it is not possible to indicate one glass composition which is preferred or even suitable for all hot pressing conditions. However, for hot pressing temperatures of from about 1200 to about 1700° C. borosilicate glass consisting of from about 83 to about 99.7% by weight $SiO_2$ and from about 0.3 to about 17% by weight $B_2O_3$ are preferred. For hot pressing of the preferred cobalt-bonded tungsten carbide compositions referred to above, the pressure-transmitting medium preferably consists of from 86 to 99% by weight of $SiO_2$ and from 1.0 to 14% by weight of $B_2O_3$.

As described hereinafter, in all instances the composition of the pressure-transmitting medium is selected on the basis of the temperature to be used in the hot pressing operation and, as is well known in the art, this in turn will depend to some extent on the identity and amount of metal binder in the billet. For any given temperature within the range of from 1200 to 1700° C. a narrow range of composition which are generally suitable can be specified. Namely, for a given predetermined hot pressing temperature (T) of from 1200 to 1700° C., the borosilicate glass should consist essentially of from about 50.4 minus 0.028T to about 47.9 minus 0.028T percent by weight of $B_2O_3$. The precent by weight of $SiO_2$ will accordingly be from about 100−(50.4−0.028T) to about 100−(47.9−0.028T), allowing, of course, for minor amounts of impurities. Conversely, for a given borosilicate glass containing X% by weight of $B_2O_3$, the hot pressing temperature at which it can be used with best results will range from about $$\frac{50.4-X}{0.028} \text{° C. to about } \frac{47.9-X}{0.028} \text{° C.}$$

Borosilicate glass having the desired composition can be produced by reacting corresponding amounts by weight of colloidally subdivided amorphous silica and boric oxide as described above or by combining two or more borosilicate glasses of differing compositions to obtain a mixture containing the desired percentages of $SiO_2$ and $B_2O_3$.

Hot pressing conditions

Isostatic hot pressing according to the methods of this invention is preferably carried out under vacuum to prevent gases from becoming trapped in the billet or the pressure-transmitting medium. However, if the particle size of the medium is coarse enough and the rate of heating slow enough to permit gases entrapped in the billet to escape as the temperature is raised, use of a vacuum is not necessary and the pressing may be carried out in an inert gas.

The mold or confining cavity in which the hot pressing is to be carried out is preferably loaded by first cold pressing a portion of the glass powder in the bottom of the mold to provide a base on which to place the billet and to assure that when the glass becomes plastic the billet will not come into contact with the bottom piston. The billet is then centered on the base thus formed and covered with the remainder of the glass powder. If several billets are to be pressed simultaneously, they will be arranged within the mold cavity such that they are separated one from the other by the glass.

The loaded mold is then heated to the temperature at which hot pressing is to be conducted and the mold and its contents are preferably allowed to equilibrate to this temperature. Hot pressing temperatures for metal-bonded metal carbides generally range from 1200 to 1700° C. depending on the identity and amount of binder metal present in the billet. As is known in the art, it is preferable to hot press at a temperature at which the binder metal is present as a liquid phase in order to obtain rapid densification of the billet. With respect to the method of this invention, the presence of the liquid phase also tends to prevent penetration of surface pores in the billet by the plastic glass.

After the billet and the surrounding glass have equilibrated to the selected hot pressing temperature, pressure is applied to the glass and slowly increased to maximum pressure. This pressure is maintained until the billet and the glass cease to deform, and is maintained for a short time thereafter to assure complete compression. The total time of hot pressing will generally not exceed about ten minutes. Less than complete compression of the billet can, of course, be obtained if desired.

A rate of pressure increase of less than 500 p.s.i. per second is preferred to assure that the glass has an opportunity to conform to the billet before the pressure reaches a point at which compression of the billet begins. The maximum and minimum pressures that can be used will be respectively limited by capabilities of the hot pressing apparatus and the desired degree of compression. Pressures in excess of 400 p.s.i. are ordinarily necessary to obtain articles having near theoretical densities, that is, at least 98% of theoretical density. Pressures in excess of 6000 p.s.i. are generally unnecessary. For the uses mentioned above, articles of near theoretical density are preferred.

After the pressure is removed it is preferred that the mold be promptly ejected from the hot zone of the hot pressing apparatus and allowed to cool rapidly to minimize grain growth within the billet. The pressed mass is then ejected from the mold and the envelope of fused glass is broken to recover the compressed billet.

While the method of this invention is ordinarily most conveniently carried out utilizing rigid hot pressing molds, this method can as well be practiced by subjecting a sealed, deformable container containing a billet surrounded with the glass to elevated temperatures and isostatic pressure.

This invention is further illustrated by the following specific examples wherein all parts and percentages are by weight unless otherwise indicated.

EXAMPLE 1

(A) A ball milled mixture of tungsten carbide and cobalt is prepared by milling for five days in a one-gallon steel mill loaded with 14,000 grams of ¼ inch cobalt-bonded carbide balls, a charge consisting of 1800 grams of fine tungsten carbide powder and 245 grams of finely divided cobalt powder having a grain size of around one micron, along with 1800 grams of acetone. The 8 inch diameter mill is run at 45 revolutions per minute for four days and the milled powder is recovered, dried and screened.

(B A cylindrical graphite mold having a length of four inches, an outside diameter of three inches, a ¾ inch by ¾ inch cavity extending along its length and a close-fitting graphite plate, approximately ¾ inch by ¾ inch square and ¼ inch thick, situated in one end is charged with 50 grams of the cobalt-containing tungsten carbide powder prepared in part (A) above. Another graphite plate, ¾ inch by ¾ inch square and ¼ inch thick is inserted above the powder and close-fitting steel pistons are inserted into each end of the mold. The mold is then encased in a close-fitting steel supporting cylinder.

Utilizing a hydraulic press, 10,000 p.s.i. are then applied to the pistons. The steel pistons and supporting cylinder are removed and the mold with graphite plates and compacted powder still in place is situated in a sintering furnace. The entire operation up to this point is carried out in an oxygen free environment.

The compacted sample is heated for 30 minutes at 1200° C. under a hydrogen atmosphere. The hydrogen penetrates to the sample between the graphite plates and the internal walls of the mold. The resulting sintered billets, ⅝ inch by ⅝ inch by ⅝ inch, has a density of about 85% of theoretical. The 15% residual porosity consists of pores of less than 15 microns in size.

(C) The inside wall of a cylindrical graphite mold four inches in length and having an inside diameter of 1⅛ inch and an outside diameter of three inches and two graphite pistons two inches long and 1⅛ inch in diameter are coated with a paste prepared by mixing about 10 grams of carbon black and about 50 milliliters of paraffinic hydrocarbon oil. The graphite parts are thoroughly heated before use to remove the oil. The carbon is used as a lubricant so that the pressure-transmitting medium can be ejected easily from the mold after hot pressing.

A homogeneous borosilicate glass powder containing about 89% $SiO_2$ and about 11% $B_2O_3$ is prepared by blending two commercially available borosilicate glass powders: forty parts of Corning Glass Works glass No. 7900 which contains about 96% $SiO_2$ and about 4% $B_2O_3$ and which has a softening point of 1500° C. and 60 parts of Corning Glass Works glass No. 7230 which contains about 88.5% $SiO_2$ and about 9% $B_2O_3$ and about 2.5% alumina and which has a softening point of 1160° C. Approximately eight grams of the mixed glass powders are then cold pressed at about 50 p.s.i. in the lubricated glass mold. After removing one graphite piston from the mold, the sintered billet obtained in part (B) above is centered on the pressed glass powder, one of the ⅝ inch by ⅝ inch faces of the billet being in contact with the glass. Then there is added an additional twenty gram quantity of the mixed glass powders which is sufficient to fill the space between the billet and the mold and cover the top of the billet. Finally, the piston is replaced and 50 p.s.i cold pressure is applied to the glass powder to thoroughly pack it around the billet.

The mold is then placed in the chamber of an inductively heated vacuum hot press furnace and the furnace is evacuated by means of a mechanical pump. When a 0.5 torr vacuum is reached, the furnace is heated at the rate of 75° C. per minute to 1000° C., at which temperature the mold is moved into the hot zone of the furnace. The temperature is then raised to 1400° C. at the same heating rate and maintained at 1400° C. for eight minutes to allow the billet and the glass to equilibrate to the furnace temperature. Pressure is then applied to both pistons and increased at a uniform rate of about 330 p.s.i. per second until a pressure of 4000 p.s.i. is reached. The pressure is maintained until the billet and the glass cease to deform, as monitored by a time-deformation chart, and an additional time of one minute is allowed to assure complete densification of the sample. The total time of hot pressing is about seven minutes, measured from the time full pressure is attained. The pressure is then removed at once and the mold is immediately ejected from the hot zone of the furnace and allowed to cool to room temperature. After cooling, the glass envelope containing the sample is ejected from the mold using a hydraulic press. The glass envelope is broken by striking it sharply with a hard object, thereby recovering the hot pressed billet.

Examination of this billet shows that its original shape is not distorted. The straight edges and sides remain the same. However, the length of the edges is shortened by about five percent of the original size. The sample is not adherent to the glass and its surface is clean. The glass itself is transparent. The cobalt in the billet is not lost by squeeze-out during hot pressing.

The strength, hardness and other properties of the billet are equivalent to those obtained by hot pressing this powder in a conventional manner.

An optical micrograph of the sample shows that the outermost "skin" of the hot pressed billet is partially decarburized to a depth of ⅟₆₀ inch. A small amount of eta-carbide (about 0.1 volume percent) is found in this decarburized layer of the billet. This outer layer is removed by grinding.

EXAMPLE 2

Six cylindrical sintered billets each having a diameter of ⅜ inch, a length of ⅝ inch and a density of about 90% of theoretical and containing 88% tungsten carbide and 12% cobalt are produced as in Example 1(B), each being produced from 15 grams of the powder prepared according to Example 1(A) using a graphite mold having a cavity with a round cross-section ½ inch in diameter. These six billets are then hot pressed simultaneously according to the procedure of Example 1(C) using a graphite mold 1½ inches in diameter. The billets are distributed evenly within the mold cavity with their long axes situated perpendicularly to the long axis of the mold.

The hot pressed billets remain round and are not adhered to the glass. The density of the billets is over 99% of theoretical. They are used as blanks for inserted tip end mills, being centerless ground, then brazed in a hollow steel shank and finish ground to ¼ inch diameter four-flute end mills. The billets recovered from the glass pressure transmitting medium are sufficiently round that they can be started directly on a centerless grinder.

EXAMPLE 3

15 grams of a powder prepared according to the procedure of Example 1(A) is charged in a nitrogen atmosphere into a thin walled rubber mold having an inside diameter of ½ inch, an outside diameter of ⅝ inch and a length of 4 inches. The mold is sealed and then isostatically pressed at 60,000 p.s.i. for one minute using water as the pressure-transmitting medium. This pressing operation is carried out at ambient temperatures. The resulting cold pressed rod is removed from the mold, again under a nitrogen atmosphere, and is sintered as in Example 1(B). The sintered billet which is ⅝ inch long and ⅜ inch in diameter and has a density of about 90% of theoretical is isostatically hot pressed as described in Example 1(C), the long axis of the sintered billet being parallel to the long axis of the mold. The density of the hot pressed billet is about 99.9% of theoretical.

EXAMPLE 4

The procedure of Example 2 is repeated using 10 grams of a powder prepared according to Example 1(A) and a cylindrical graphite mold which is four inches long and has an inside diameter of ⅜ inch. The compacted sample is sintered at 1250° C.

The resulting sintered billet which is ⅝ inch long and ¼ inch in diameter and which is about 90% of theoretical density is hot pressed by the procedure of Example 1(C) with the modification that 10,000 p.s.i. cold pressure is applied to the glass powder to pack it around the billet.

The properties of the hot pressed billet are essentially the same as those of the billets obtained in Example 2.

EXAMPLE 5

Example 1(C) is repeated with the modification that the glass powder utilized consists of 91% $SiO_2$ and 9% $B_2O_3$ and with the further modification that throughout the eight minute equilibration period a pressure of 1000 p.s.i. is applied to the glass. The glass is prepared by mixing an aqueous suspension of 100 grams of "Arc Silica" 800 (Pittsburgh Plate Glass Company) with 150 milliliters of distilled water containing 19.7 grams of boric acid and 10 milliliters of concentrated ammonia, drying the suspension and heating the residue at 900° C. for 24 hours.

The hot pressed billet has a density which is about 99.5% of theoretical. The other properties of the billet are essentially the same as those of the billet obtained in Example 1(C).

EXAMPLE 6

Example 4 is repeated with the modification that the glass powder utilized has the same composition as that utilized in Example 5. The properties of the hot pressed billet obtained are essentially the same as those of the billet obtained in Example 1(C).

EXAMPLE 7

A 12% cobalt tungsten carbide powder is prepared as outlined in Example 1(A) up to and including the drying step after ball milling. Twenty-one parts of the unreduced powder is loaded into a ⅜ inch diameter 40% porous alumina tube 6 inches long. This is accomplished in a nitrogen atmosphere. One end of the tube is packed with carbon felt. The filled tube is tapped down against a metal plate at 100 taps a minute for one minute. The approximate compacted density is 25%. A second piece of graphite felt is placed in the other end of the tube and the entire assembly is placed in a reduction-sintering furnace. The methane and hydrogen gas flow rates are adjusted to 0.04 and 2.8 liters per minute, respectively. The sample is reduced in this atmosphere for two hours at 900 C. The methane flow is turned off leaving the hydrogen flow on while the temperature is raised to 1250° C. for an additional 30 minutes. After the hydrogen has been swept out with nitrogen, the sample is removed from the furnace. The density of the sintered billet (2 inches long and ¼ inch in diameter) is approximately 85% of theoretical.

This billet is hot pressed by the procedure of Example 1(C) modified in that the graphite mold utilized is 4 inches long, has a 7 inch outside diameter and has a ⅝ inch by 4 inch cavity, heat-up rate is about 12° C. per minute, the atmosphere in the hot press furnace is nitrogen and the maximum hot pressing pressure is 3000 p.s.i.

The hot pressed billet has a density which is about 98% of theoretical and is as strong and hard as articles of similar composition produced by conventional hot pressing procedures.

EXAMPLE 8

Example 1(C) is repeated using a hot pressing temperature of 1375° C., a maximum hot pressing pressure of 6000 p.s.i. and a hot pressing time of 40 minutes.

The transverse rupture strength of the hot pressed billet is 400,000 p.s.i., the Rockwell A hardness number is 89.0 and the density is about 99.5% of theoretical.

EXAMPLE 9

Example 1(C) is repeated using a hot pressing temperature of 1425° C., a maximum hot pressing pressure of 500 p.s.i. and a hot pressing time of 40 minutes.

The transverse rupture strength of the billet is over 350,000 p.s.i., the Rockwell A hardness number is 89.0 and the density is about 99% of theoretical.

EXAMPLE 10

Example 1(C) is repeated with the modification that two sintered billets prepared by the procedure of Example 1(B), one a square rod ¼ inch thick and ⅝ inch in length and the other a rectangular piece ⅝ inch by ⅝ inch by ⅜ inch, are situated in the mold, one on top of the other with a ⅜ layer of the glass powder in between. 25 grams of glass powder are required to thoroughly pack the samples.

The densities of both hot pressed billets are about 99.7% of theoretical.

EXAMPLE 11

Example 1(B) is repeated with the modification that the sample is sintered under vacuum at 1250° C. The resulting sintered billet is hot pressed according to the procedure of Example 1(B) using a rate of pressure increase of 100 p.s.i. per second. The density of the billet is about 99% of theoretical.

EXAMPLE 12

A tungsten carbide powder containing three percent cobalt is prepared by the procedure of Example 1(A). Example 1(B) is then repeated using 20 grams of this one percent cobalt-tungsten carbide powder; however, the powder is cold pressed at 100,000 p.s.i. prior to sintering and the resulting compact is sintered under vacuum at 1250° C. for 40 minutes. The resulting sintered billet is about 60% of theoretical density.

This billet is hot pressed according to the procedure of Example 1(C) using a borosilicate glass powder consisting of 99% $SiO_2$ and 1% $B_2O_3$, a hot pressing temperature of 1500° C., a temperature equilibration time of 10 minutes and a pressing time of 9 minutes.

The hot pressed billet has a transverse rupture strength and a Rockwell A hardness number of 200,000 p.s.i. and 93.0, respectively. The billet is about 99% of theoretical density.

EXAMPLE 13

50 grams of a 30% cobalt-tungsten carbide powder prepared by the procedure of Example 1(A) is cold pressed in a carbide lined cavity according to the procedure of Example 1(B) into the shape of a wire extrusion die. The compact, which is essentially a short cylinder with a tapered hole through the central axis, is sintered in an atmosphere of argon at 1200° C. for 20 minutes.

This sintered billet, which has a density of about 92% of theoretical, is isostatically hot pressed according to the procedure of Example 2 using a borosilicate glass powder consisting of 85% $SiO_2$ and 15% $B_2O_3$ a hot pressing temperature of 1200° C., an equilibration period of five minutes and a pressing time of five minutes.

The hot pressed billet has a transverse rupture strength of 420,000 p.s.i., a Rockwell A hardness number of 87.0 and a density of about 99.9% of theoretical. The die is ground to standard dimensions before use.

EXAMPLE 14

A tungsten carbide powder containing 40% of iron as the binder metal is prepared as outlined in Example 1(A) using a high purity iron powder of one to three microns in diameter instead of the cobalt. The following proportions are placed in the ball mill before subsequent milling: 1200 parts tungsten carbide, 800 parts iron and 800 parts acetone. After the powder has been milled, dried and treated in the reduction furnace, 35 grams are used in a repetition of Example 1(B) with the modification that the compact is sintered in a helium atmosphere at 1130° C. for 30 minutes. The resulting sintered billet is about 65% of theoretical density.

The sintered billet is then hot pressed by the procedure of Example 13 to yield a billet having a transverse rupture strength of 230,000 p.s.i. and Rockwell A hardness number of 86 and a density which is about 98% of theoretical. Essentially no distortion of the sintered billet occurs during hot pressing.

EXAMPLE 15

A tungsten carbide powder containing 40% of nickel as the binder metal is prepared as outlined in Example 1(A) using a high purity nickel powder of 1 to 3 microns in diameter instead of the cobalt. The following proportions are placed in the ball mill before subsequent milling: 1200 parts tungsten carbide, 800 parts iron and 1800 parts acetone. After the powder has been milled, dried and treated in the reduction furnace, 40 grams are used in a repetition of Example 1(B) with the modification that the sample is sintered under vacuum at 1300° C. for 30 minutes.

The resulting sintered billet which is about 70% of theoretical density is hot pressed by the procedure of Example 13 to yield a billet having a transverse rupture strength of 270,000 p.s.i., a Rockwell A hardness number of 88 and a density which is about 98.5% of theoretical. Distortion of the billet during hot pressing is very minor.

EXAMPLE 16

A titanium carbide powder containing 7.5% nickel and 7.5% molybdenum as binder metals is prepared by ball milling the following materials as described in Example 1(A): 1700 parts of titanium carbide powder of about 1 micron average diameter, 150 parts of nickel powder of about 0.2 micron average diameter, 150 parts of molybdenum powder of about 0.3 micron average diameter and 1800 parts of acetone.

Utilizing the cold pressing and sintering method of Example 1(B), a sintered billet of about 75% of theoretical density is fabricated from this powder. The billet is in the shape of a triangular cutting tool insert 3/16 inch thick and 3/8 inch inscribed circle size with a center hole for the locating pin on a cutting tool holder.

This sintered billet is then isostatically hot pressed by the procedure outlined in Example 1(C) using a borosilicate glass consisting of 95% $SiO_2$ and 5% $B_2O_3$ and a hot pressing temperature of 1550° C. The hot pressed billet obtained has a transverse rupture strength of 150,000 p.s.i., Rockwell A hardness number of 92.0 and a density which is about 99.5% of theoretical. The insert is ground to standard dimensions for use as a throw-away type of insert.

EXAMPLE 17

A powder containing 72% tungsten carbide, 12% titanium carbide, 8% tantalum carbide carbide and 8% cobalt is prepared by ball milling the following materials as described in Example 1(A): 1440 parts of tungsten carbide powder of about 40 millimicrons average diameter, 240 parts of titanium carbide powder of about 1 micron average diameter, 160 parts of tantalum carbide powder of 0.2 micron average diameter, 160 parts of cobalt powder of about 1 micron average diameter and 1800 parts of acetone.

The milled powder is dried and cold pressed to form compacts having the shape of positive rake cutting tool inserts 3/4 inch square and 1/4 inch thick. The compacts are sintered under an atmosphere of hydrogen at a temperature of 1250° C. to yield billets which are about 80% of theoretical density.

These sintered billets are isostatically hot pressed six at a time in a three inch diameter mold as described in Example 2 using a hot pressing temperature of 1500° C. and a borosilicate glass powder containing 93% of $SiO_2$ and 7% $B_2O_3$ as the pressure-transmitting medium. The hot pressed billets are ground to 1/2 inch by 1/2 inch by 1/8 inch positive rake cutting tool inserts.

EXAMPLE 18

A thin walled rubber mold is produced by dipping a conventional drill bit five inches long and one-half inch in diameter into a rubber latex, withdrawing the bit and, after the latex coating has dried, peeling the rubber from the bit.

This mold is then utilized in a repetition of Example 3. All the contours of the bit used to produce the rubber mold are duplicated in the hot pressed billet obtained without substantial distortion and little finish-grinding is required. The diameter and the length of the billet are respectively about 40% and about 25% less than the diameter and length of the bit.

What is claimed is:

1. A method of isostatically hot pressing a porous metal-bonded metal carbide body fabricated by powdered metallurgical techniques comprising surrounding said body with borosilicate glass consisting essentially of from about 83% to about 99.7% by weight $SiO_2$ and from about 0.3% to about 17% by weight $B_2O_3$, said glass being essentially free of alkali and alkaline earth metals, heating said glass to a temperature sufficient to render it plastic and while maintaining said temperature, applying to said glass sufficient pressure to increase and density of said body.

2. The method of claim 1 wherein substantially all surface pores in said body are originally less than 100 microns in diameter.

3. The method of claim 1 wherein substantially all surface pores in said body are originally less than 50 microns in diameter.

4. The method of claim 1 wherein substantially all surface pores in said body are originally less than 10 microns in diameter.

5. The method of claim 1 wherein the original density of said body is at least 60% of theoretical.

6. The method of claim 1 wherein the original density of said body is at least 90% of theoretical.

7. The method of claim 1 wherein said pressure is sufficient to increase the density of said body to at least 98% of theoretical.

8. The method of claim 1 wherein said glass is heated to a temperature of from about $$\frac{47.9-X}{0.028} ° C. \text{ to about } \frac{50.4-X}{0.028} ° C.$$

where X is the percent by weight of $B_2O_3$ in said glass.

9. The method of claim 8 wherein substantially all surface pores in said body are originally less than 100 microns in diameter.

10. The method of claim 1 wherein said body comprises from about 70% to about 97% by weight of a metal carbide selected from the group consisting of tungsten carbide, tantalum carbide, titanium carbide, niobium carbide and mixtures thereof and from about 3% to about 30% by weight of a binder metal selected from the group consisting of iron, cobalt, molybdenum, nickel and alloys thereof.

11. The method of claim 10 wherein said glass is heated to a temperature of from about $$\frac{47.9-X}{0.028} ° C. \text{ to about } \frac{50.4-X}{0.028} ° C.$$

where X is the percent by weight of $B_2O_3$ in said glass.

12. The method of claim 11 wherein said body comprises from about 85% to about 94% by weight tungsten carbide and from about 6% to about 15% by weight cobalt, wherein substantially all surface pores in said body are originally less than 100 microns in diameter and wherein said pressure is sufficient to increase the density of said body to at least 98% of theoretical.

13. The method of claim 10 wherein substantially all surface pores in said body are originally less than 100 microns in diameter.

14. The method of claim 10 wherein substantially all surface pores in said body are originally less than 50 microns in diameter.

15. The method of claim 10 where substantially all surface pores in said body are originally less than 10 microns in diameter.

16. A method of producing a dense, metal-bonded metal carbide article comprising compacting at ambient temperatures a mixture comprising from about 70% to about 97% by weight of a metal carbide selected from the group consisting of tungsten carbide, tantalum carbide, titanium carbide, niobium carbide and mixtures thereof and from about 3% to about 30% by weight of a binder metal selected from the group consisting of iron, cobalt, molybdenum, nickel and alloys thereof; sintering the resulting compact in a non-oxidizing environment to a density of at least 60% of theoretical; surrounding the resulting sintered body with a borosilicate glass consisting essentially of from about 83% to about 99.7% by weight SiO$_2$ and from about 0.3% to about 17% by weight B$_2$O$_3$, said glass being essentially free of alkali and alkaline earth metals; heating said glass to a temperature sufficient to render it plastic; while maintaining said temperature, applying to said glass a pressure sufficient to increase the density of said body; removing said pressure; and promptly allowing said glass and said body to cool to ambient temperatures.

17. The method of claim 16 wherein said temperature is from about $$\frac{47.9-X}{0.028} °C. \text{ to about } \frac{50.4-X}{0.028} °C.$$

where X is the percent by weight B$_2$O$_3$ in said glass.

18. The method of claim 16 wherein said compact is sintered to a density of at least 90% of theoretical, 19. The method of claim 16 wherein said compact is sintered to a density of at least 90% of theoretical and wherein said glass is heated to a temperature of from about $$\frac{47.9-X}{0.028} °C. \text{ to about } \frac{50.4-X}{0.028} °C.$$

where X is the percent by weight of B$_2$O$_3$ in said glass.

20. The method of claim 16 wherein said compact is sintered to a density of at least 90% of theoretical, wherein said glass is heated to a temperature of from about $$\frac{47.9-X}{0.028} °C. \text{ to about } \frac{50.4-X}{0.028} °C.$$

where X is the percent by weight of B$_2$O$_3$ in said glass and wherein said pressure is sufficient to increase the density of said body to at least 98% of theoretical.

21. The method of claim 16 wherein said mixture comprises from about 85% to about 94% by weight tungsten carbide and from about 6% to about 15% by weight cobalt.

22. The method of claim 16 wherein said mixture comprises from about 85% to about 94% by weight tungsten carbide and from about 6% to about 15% by weight cobalt and wherein said compact is sintered to a density of at least 90% of theoretical.

23. The method of claim 16 wherein said mixture comprises from about 85% to about 94% by weight tungsten carbide and from about 6% to about 15% by weight cobalt, where in said compact is sintered to a density of at least 90% of theoretical and wherein said glass is heated to a temperature of from about $$\frac{47.9-X}{0.028} °C. \text{ to about } \frac{50.4-X}{0.028} °C.$$

where X is is the percent by weight of B$_2$O$_3$ in said glass.

24. The method of claim 16 wherein said mixture comprises from about 85% to about 94% by weight tungsten carbide and from about 6% to about 15% by weight cobalt, wherein said compact is sintered to a density of at least 90% of theoretical, wherein said glass is heated to a temperature of from about $$\frac{47.9-X}{0.028} °C. \text{ to about } \frac{50.4-X}{0.028} °C.$$

where X is the percent by weight of B$_2$O$_3$ in said glass and wherein said pressure is sufficient to increase the density of said body to at least 98% of theoretical.

References Cited
UNITED STATES PATENTS

| | | | |
|---|---|---|---|
| 2,510,546 | 6/1950 | Brennan | 75—223 X |
| 2,568,157 | 9/1951 | Lapp | 75—223 X |
| 2,928,733 | 3/1960 | Wagner | 75—223 X |
| 3,279,917 | 10/1966 | Ballard | 75—226 |
| 3,284,195 | 11/1966 | Googin | 75—226 |
| 3,344,209 | 9/1967 | Hague | 75—226 X |

BENJAMIN R. PADGETT, Primary Examiner

A. J. STEINER, Assistant Examiner

U.S. Cl. X.R.

75—205, 223, 226